US010880639B2

(12) United States Patent
Nakayama

(10) Patent No.: US 10,880,639 B2
(45) Date of Patent: Dec. 29, 2020

(54) ULTRASONIC WAVE OUTPUT APPARATUS

(71) Applicant: DENSO CORPORATION, Kariya (JP)

(72) Inventor: Toshiaki Nakayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/571,340

(22) Filed: Sep. 16, 2019

(65) Prior Publication Data
US 2020/0015004 A1 Jan. 9, 2020

Related U.S. Application Data

(63) Continuation of application No. PCT/JP2018/012069, filed on Mar. 26, 2018.

(30) Foreign Application Priority Data

Mar. 28, 2017 (JP) ................. 2017-062753

(51) Int. Cl.
H04R 1/40 (2006.01)
G10K 11/34 (2006.01)

(52) U.S. Cl.
CPC ............. H04R 1/403 (2013.01); G10K 11/34 (2013.01); H04R 2201/401 (2013.01); H04R 2217/03 (2013.01); H04R 2499/13 (2013.01)

(58) Field of Classification Search
CPC ............. H04R 1/403; H04R 2201/401; H04R 2217/03; H04R 2499/13; G10K 11/34
See application file for complete search history.

(56) References Cited

FOREIGN PATENT DOCUMENTS

| JP | 2004097851 A | * | 4/2004 |
| JP | 2011162073 A | | 8/2011 |
| JP | 2018125721 A | | 8/2018 |

OTHER PUBLICATIONS

English machine translation of JP 2004-097851 (Matsuo, Ultrasonic Vibration Device, published Apr. 2004) (Year: 2004).*

* cited by examiner

Primary Examiner — Mark Fischer
(74) Attorney, Agent, or Firm — Harness, Dickey & Pierce, P.L.C.

(57) ABSTRACT

An ultrasonic wave output apparatus includes at least one ultrasonic wave output unit and a vibration portion. The ultrasonic wave output unit is configured to output ultrasonic waves corresponding to an input signal from a sound wave output surface along a predetermined travel direction. The vibration portion has a vibration surface parallel to the sound wave output surface and set at a distance $n\lambda$ from the sound wave output surface, where n is an integer of 0 or more and $\lambda$ is the wavelength of the ultrasonic waves, and is a plate-like member that surrounds the periphery of the ultrasonic wave output unit in directions at right angles to the travel direction, and is configured to transmit vibration produced by the ultrasonic wave output unit to the vibration surface.

8 Claims, 8 Drawing Sheets

ULTRASONIC WAVE OUTPUT APPARATUS

CROSS-REFERENCE TO RELATED APPLICATION

This application is a U.S. application under 35 U.S.C. 111(a) and 363 that claims the benefit under 35 U.S.C. 120 from International Application No. PCT/JP2018/012069 filed on Mar. 26, 2018, the entire contents of which are incorporated herein by reference. This application also claims the benefit of priority of Japanese Patent Application No. 2017-62753 filed with the Japan Patent Office on Mar. 28, 2017, and the entire contents of which are incorporated herein by reference.

BACKGROUND

Technical Field

The present disclosure relates to an ultrasonic wave output apparatus.

Background Art

A technology is known for utilizing a parametric speaker in a vehicle.

SUMMARY

An ultrasonic wave output apparatus according to one aspect of the present disclosure includes at least one ultrasonic wave output unit and a vibration portion. The vibration portion has a vibration surface that is parallel to the sound wave output surface, and is set at a distance $n\lambda$ from the sound wave output surface, where n is an integer of 0 or more and $\lambda$ is the wavelength of the ultrasonic waves.

DETAILED DESCRIPTION OF THE PREFERRED EMBODIMENTS

Figure 1:
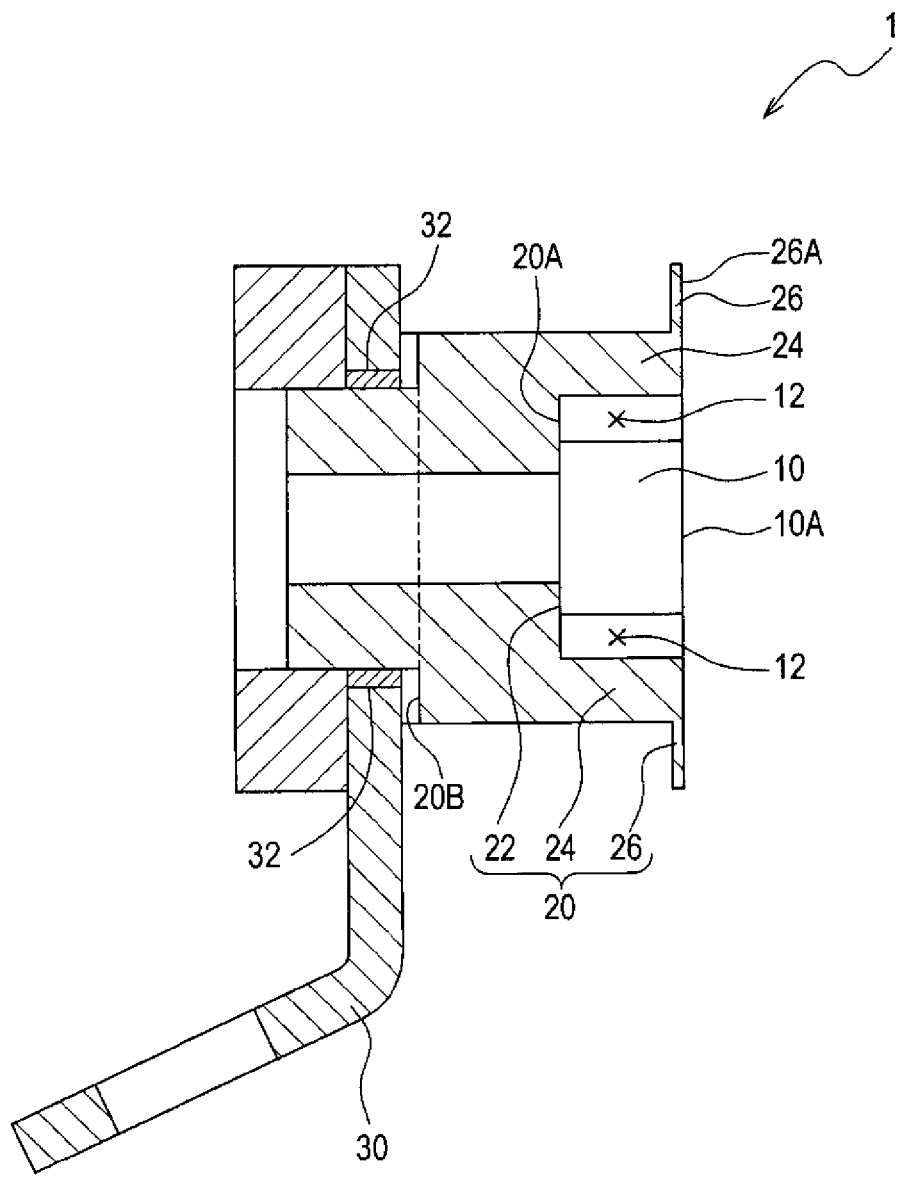
FIG. 1 is a sectional view of a first embodiment of an ultrasonic wave output apparatus, taken in a plane I-I of FIG. 2.

The inventor of the present disclosure has studied an ultrasonic wave output apparatus whereby the directionality can be changed without changing the size of the sound wave output surface of an ultrasonic wave output unit.

According to technologies which use an ultrasonic wave output apparatus such as a parametric speaker, it is required that the directionality can be changed in accordance with their applications. As a result of detailed examination by the inventors, it has been found that although the directionality can be changed in accordance with requirements by changing the size of the sound wave output surface, this raises problems of inconvenience and cost in making design changes for each application.

The present disclosure provides a technology for an ultrasonic wave output apparatus whereby the directionality can be changed without changing the size of the sound wave output surface of an ultrasonic wave output unit.

An ultrasonic wave output apparatus according to one aspect of the present disclosure includes at least one ultrasonic wave output unit and a vibration portion. The ultrasonic wave output unit is configured to output ultrasonic waves corresponding to an input signal, from a sound wave output surface, in a predetermined travel direction.

The vibration portion has a vibration surface that is parallel to the sound wave output surface, is set at a distance $n\lambda$ from the sound wave output surface, where n is an integer of 0 or more and $\lambda$ is the wavelength of the ultrasonic waves, is configured as a plate-like member which surrounds the periphery of the ultrasonic wave output unit, in directions orthogonal to the travel direction of the ultrasonic waves, and is configured to transmit vibration generated by the ultrasonic wave output unit to the vibration surface.

According to the ultrasonic wave output apparatus, the vibration portion has a vibration surface that is set at a distance of $n\lambda$ from the sound wave output surface, and the vibration portion can function as part of the ultrasonic wave output unit. With such a configuration, the same directionality can be obtained with the vibration portion as for the case in which the size of the sound wave output surface of the ultrasonic wave output unit is changed. Hence the directionality can be changed without changing the size of the sound wave output surface of the ultrasonic wave output unit.

Here, the term "parallel" is not necessarily restricted to the strict sense of the word, and the relationship does not need to be parallel so long as the same effects as those described above are exhibited. Furthermore, the reference signs shown in parentheses in this description and in the claims are for indicating correspondence relationships to specific means, which are described as a mode of the invention in embodiments below, and do not limit the technical scope of the present disclosure.

Embodiments, each being one mode of the present disclosure, are described in the following referring to the drawings.

1. First Embodiment

[1-1. Configuration]

Figure 2:
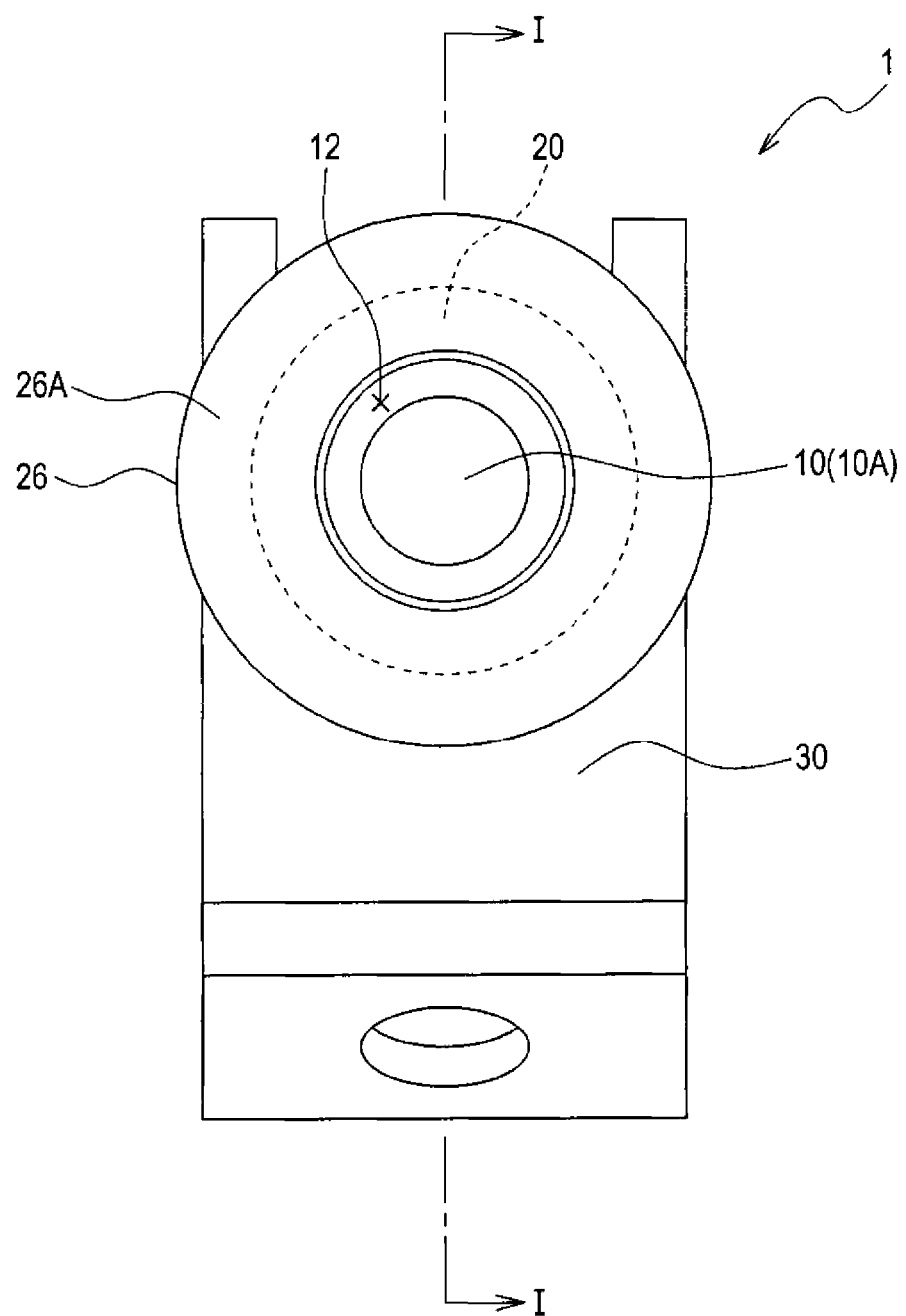
FIG. 2 is a front view of the first embodiment of an ultrasonic wave output apparatus.
Figure 3:
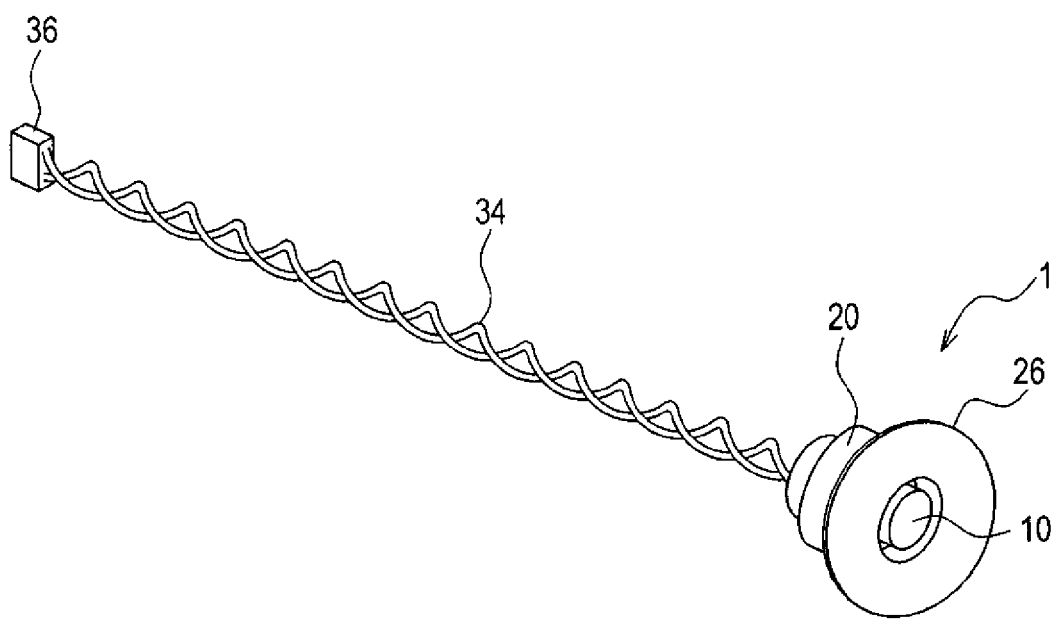
FIG. 3 is a perspective view of the first embodiment of an ultrasonic wave output apparatus.

An ultrasonic wave output apparatus 1 according to a first embodiment, which is shown in FIGS. 1, 2 and 3, is an apparatus which outputs ultrasonic waves. The ultrasonic wave output apparatus 1 includes an ultrasonic wave output unit 10 and a case unit 20. The ultrasonic wave output unit 10 is configured as a parametric speaker which outputs audible sound by means of ultrasonic waves.

The ultrasonic wave output unit 10 receives an input signal from an ultrasonic wave amplifier (not shown in the drawings) via a lead 34 that is provided with a connector 36 as shown in FIG. 3, and outputs audible sound having directionality and corresponding to the input signal. As the input signal, a signal for modulation of the amplitude of ultrasonic waves having a predetermined frequency (for example 40 kHz) and itself having constant amplitude is supplied to produce prescribed audible sound.

As shown in FIGS. 1, 2 and 3, the ultrasonic wave output unit 10 is configured, for example, with a cylindrical shape, and outputs ultrasonic waves corresponding to the input signal along a travel direction that is vertical to a sound wave output surface 10A which is at one end of the ultrasonic wave output unit 10. In FIG. 1 the travel direction is shown as being towards the right, while in FIG. 2 the travel direction is forward, out of the plane of the paper. It should be noted that although a single ultrasonic wave output unit 10 is incorporated in the case of the example of FIGS. 1, 2 and 3, a plurality of ultrasonic wave output units 10 may be incorporated.

The case unit 20 is a member that is made of a metal such as a stainless steel or aluminum alloy, and that surrounds and retains the ultrasonic wave output unit 10. The case unit 20 is formed with a cylindrical shape, having stepped portions 20A and 20B at an inner-diameter part and an outer-diameter part. The case unit 20 is configured such that its inner diameter and outer diameter become increased, towards the travel direction side, due to the stepped portions 20A and 20B.

It should be noted that "cylindrical shape" or "tubular shape" include "substantially cylindrical shape" or "substantially tubular shape". Furthermore, the stepped portion 20A at the inner diameter part functions as a retaining portion 22. The retaining portion 22 holds the ultrasonic wave output unit 10, either directly or indirectly via another member, in contact with a surface that is opposite the ultrasonic wave output unit 10 with respect to the travel direction.

A part of the case unit 20 having a larger inner diameter functions as a cylindrical portion 24. The cylindrical portion 24 surrounds the periphery of the ultrasonic wave output unit 10, in directions vertical to the travel direction. However, a gap 12 is formed between the cylindrical portion 24 and the ultrasonic wave output unit 10 with a constant distance between the cylindrical portion 24 and the ultrasonic wave output unit 10.

The cylindrical portion 24 is formed with a cylindrical shape and is connected, at its end which is on the side of the travel direction, to a vibration portion 26 which protrudes radially outward. The vibration portion 26 is formed with an annular shape, and surrounds the periphery of the ultrasonic wave output unit 10. In the case unit 20, the cylindrical portion 24 is formed integrally with the retaining portion 22 and the vibration portion 26.

The vibration portion 26 is configured such that the surface at the travel direction side constitutes a vibration surface 26A, which is formed to be in the same plane as the sound wave output surface 10A. Here, "in the same plane as" means that ultrasonic waves which are emitted from the vibration surface 26A and ultrasonic waves emitted from the sound wave output surface 10A are identical in frequency and identical in phase.

The vibration portion 26 is configured such as to vibrate together with the entire case unit 20. The vibration portion 26 has a smaller thickness than that of the cylindrical portion 24.

Vibration, due to reaction to when ultrasonic waves are emitted by the ultrasonic wave output unit 10, is transmitted to the case unit 20, and as a result, ultrasonic waves that have the same frequency and same phase as the ultrasonic waves emitted from the sound wave output surface 10A are emitted from the vibration surface 26A of the vibration portion 26. It should be noted that the ultrasonic wave output apparatus 1 has a characteristic whereby the directionality becomes increased in accordance with increase of the area of the vibration surface 26A, and the area of the vibration surface 26A (that is to say the diameter of the vibration surface 26A) is set in accordance with the required directionality.

The ultrasonic wave output apparatus 1 further includes a support member 30 and a vibration suppression member 32. The support member 30 supports the case unit 20 in a condition of retaining the ultrasonic wave output unit 10. The support member 30 supports the case unit 20 behind the outer-diameter stepped portion 20B of the case unit 20 with respect to the travel direction via the vibration suppression member 32.

The vibration suppression member 32 is a ring-shaped member that is disposed between the retaining portion 22 and the support member 30, and is formed of a material which is softer than the material of the retaining portion 22. With this configuration, the vibration produced by the ultrasonic wave output unit 10 is transmitted to the case unit 20 and is not readily transmitted to the support member 30, so that output loss is suppressed.

With regard to the hardness or softness of the retaining portion 32, it is made softer than a material that can readily absorb the vibration of the ultrasonic waves. For example, for strictly comparing materials for hardness/softness, samples can be prepared which have identical shapes, and each sample can be made to vibrate by being fixed at one end, then having a load applied to the other end, and having the load released. A material which exhibits a low frequency of vibration can be assumed to be a soft material. A gasket made of a plastic such as rubber, a rubber plate or the like, or a rubber adhesive, etc., may be used as the vibration suppression member 32.

[1-2. Effects]

The following effects are exhibited by the first embodiment described above.

(1a) The ultrasonic wave output apparatus 1 includes an ultrasonic wave output unit 10 and a case unit 26. The ultrasonic wave output unit 10 is configured such that ultrasonic waves in accordance with an input signal are outputted from the sound wave output surface 10A in a predetermined travel direction. The vibration portion 26 has the vibration surface 26A positioned in the same plane as the sound wave output surface 10A.

With such an ultrasonic wave output apparatus 1, since the vibration portion 26 can function as a part of the ultrasonic wave output unit 10, the same directionality can be obtained by means of the vibration portion 26 as can be obtained by changing the size of the sound wave output surface 10A of the ultrasonic wave output unit 10. Hence the directionality can be changed without varying the size of the sound wave output surface 10A of the ultrasonic wave output unit 10.

Furthermore, with such an ultrasonic wave output apparatus 1, since the vibration portion 26A is positioned in the same plane as the sound wave output surface 10A, the ultrasonic waves can be outputted effectively even when frequency-modulated ultrasonic waves are produced.

Figure 4:
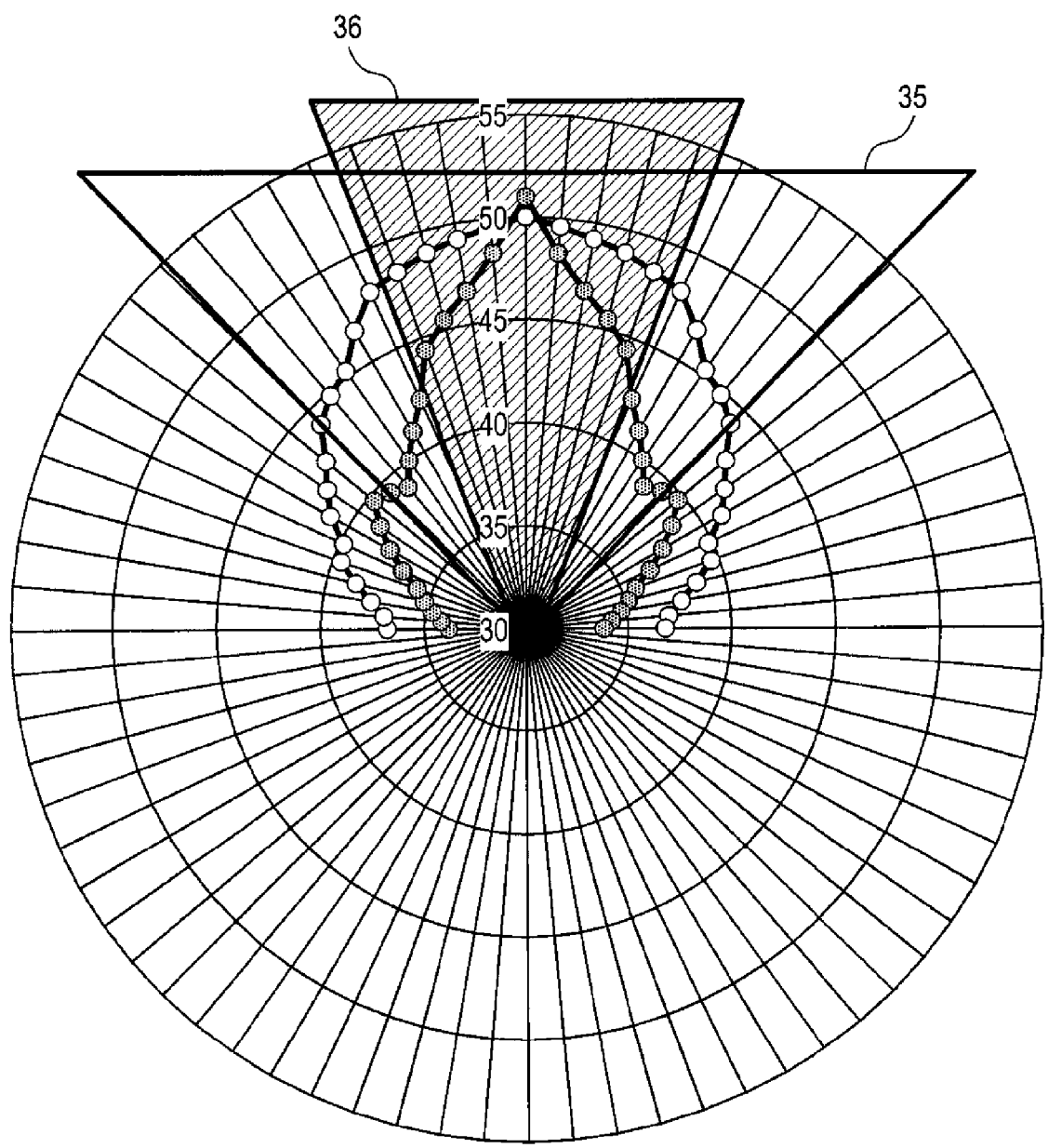
FIG. 4 is a plan view illustrating the directionality of the ultrasonic wave output apparatus.

It should be noted that if the ultrasonic waves were emitted from the ultrasonic wave output unit 10 without providing a vibration portion 26, then the ultrasonic waves would become radiated over a relatively wide range, as illustrated by the white circles in FIG. 4. These white circles in FIG. 4 indicate points that are at the same level of sound pressure.

Furthermore in FIG. 4, a radiation region 35 shows a region in which the sound pressure levels along the direction of the central axis of the ultrasonic wave output unit 10 are equal to or higher than a reference sound pressure (for example −6 dB). The "direction of the central axis of the ultrasonic wave output unit 10" means a direction which follows the travel direction from the center of the ultrasonic wave output unit 10, and which, in FIG. 4, is a vertical direction that extends directly upward from the center of the concentric circles.

On the other hand, when ultrasonic waves are emitted from the ultrasonic wave output unit 10 of the first embodiment, which includes the vibration portion 26, these ultrasonic waves are radiated within a relatively narrow range, such as that indicated by the shaded circles in FIG. 4. The shaded circles indicate points at which the sound pressure is the same as at the above-described white circles. Furthermore in FIG. 4, the emission region 36 is a region in which the sound pressure levels along the direction of the central axis of the ultrasonic wave output unit 10 are equal to or higher than a reference sound pressure that is the same as for the case in which the vibration portion 26 is not provided.

It can be understood that with the configuration of this embodiment, higher directionality can be achieved than for the case in which the vibration portion 26 is not provided.

(1b) In the ultrasonic wave output apparatus 1 of the above embodiment, the vibration portion 26 is configured to have an annular shape, surrounding the periphery of the ultrasonic wave output unit 10.

With such an ultrasonic wave output apparatus 1, since the vibration portion 26 has an annular shape, the vibration portion 26 can be made to vibrate uniformly, with the sound wave output surface 10A as center.

(1c) The ultrasonic wave output apparatus 1 of the above embodiment is further provided with a cylindrical portion 24. The cylindrical portion 24 surrounds the periphery of the ultrasonic wave output unit 10 in directions orthogonal to the travel direction, and is configured for retaining the ultrasonic wave output unit 10 while being connected to the vibration portion 26 at one end of the travel direction side.

With such an ultrasonic wave output apparatus 1, the vibration generated by the ultrasonic wave output unit 10 can be transmitted to the vibration portion 26 by the cylindrical portion 24. Furthermore, the outer peripheral part of the ultrasonic wave output unit 10 can be protected by the cylindrical portion 24.

(1d) The cylindrical portion 24 in the ultrasonic wave output apparatus 1 of the above embodiment has a cylindrical shape, surrounding the periphery of the ultrasonic wave output unit 10.

With such an ultrasonic wave output apparatus 1, since the cylindrical portion 24 is formed with a cylindrical shape, the vibration that is generated at the sound wave output surface 10A can be uniformly transmitted to the vibration portion 26.

[1-3. Variation of the First Embodiment]

With the first embodiment described above, the vibration surface 26A is configured to be positioned in the same plane as the sound wave output surface 10A, however the present invention is not limited to such a configuration.

Figure 5:
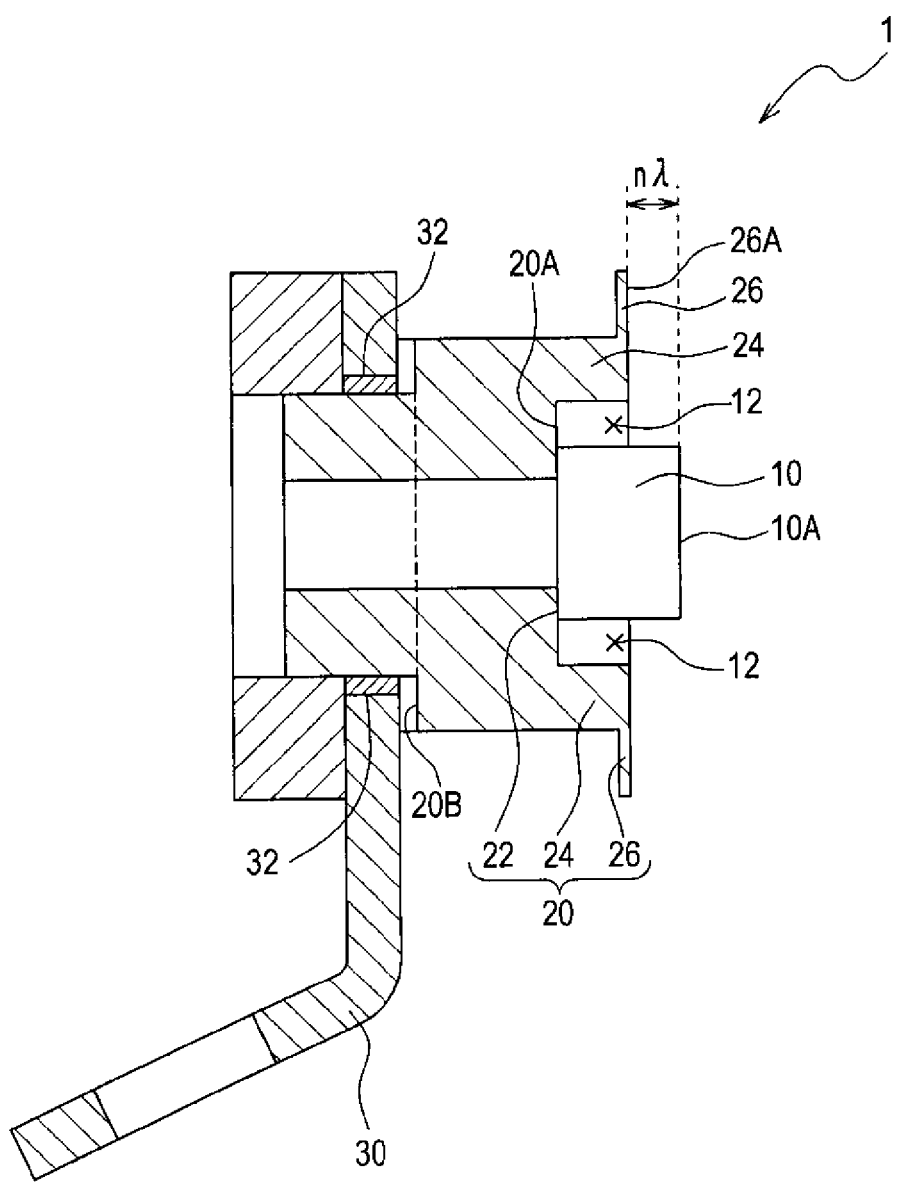
FIG. 5 is a central sectional view of a variation of the first embodiment.

With an ultrasonic wave output apparatus 2 shown in FIG. 5, which is a variation of the first embodiment, the vibration portion 26 can be set at a position whereby the vibration surface 26A is parallel to the sound wave output surface 10A but whereby the vibration surface 26A is positioned at a distance $n\lambda$ from the sound wave output surface 10A. Here, n is an integer of 0 or more, and $\lambda$ is the wavelength of the ultrasonic waves.

In this case, the sound wave output surface 10A is preferably positioned further to the travel direction side than the vibration surface 26A. This is for suppressing interference from sound waves that are transmitted from the ultrasonic wave output unit 10A and reflected by the cylindrical portion 24.

With such an ultrasonic wave output apparatus 2, since the vibration surface 26A is set at a distance $n\lambda$ from the sound wave output surface 10A, the vibration portion 26 can be made to function as a part of the ultrasonic wave output unit 10, in the same way as for the (1a) described above.

2. Second Embodiment

[2.1 Points of Difference from First Embodiment]

The second embodiment is basically similar in configuration to the first embodiment, and hence the differences will be described. Reference signs that are the same as those for the first embodiment indicate the same configuration, and refer to the preceding description.

With the first embodiment described above, a single ultrasonic wave output unit 10 is provided. In contrast, the second embodiment differs from the first embodiment by including a plurality of ultrasonic wave output units 10.

[2-2. Configuration]

Figure 6:
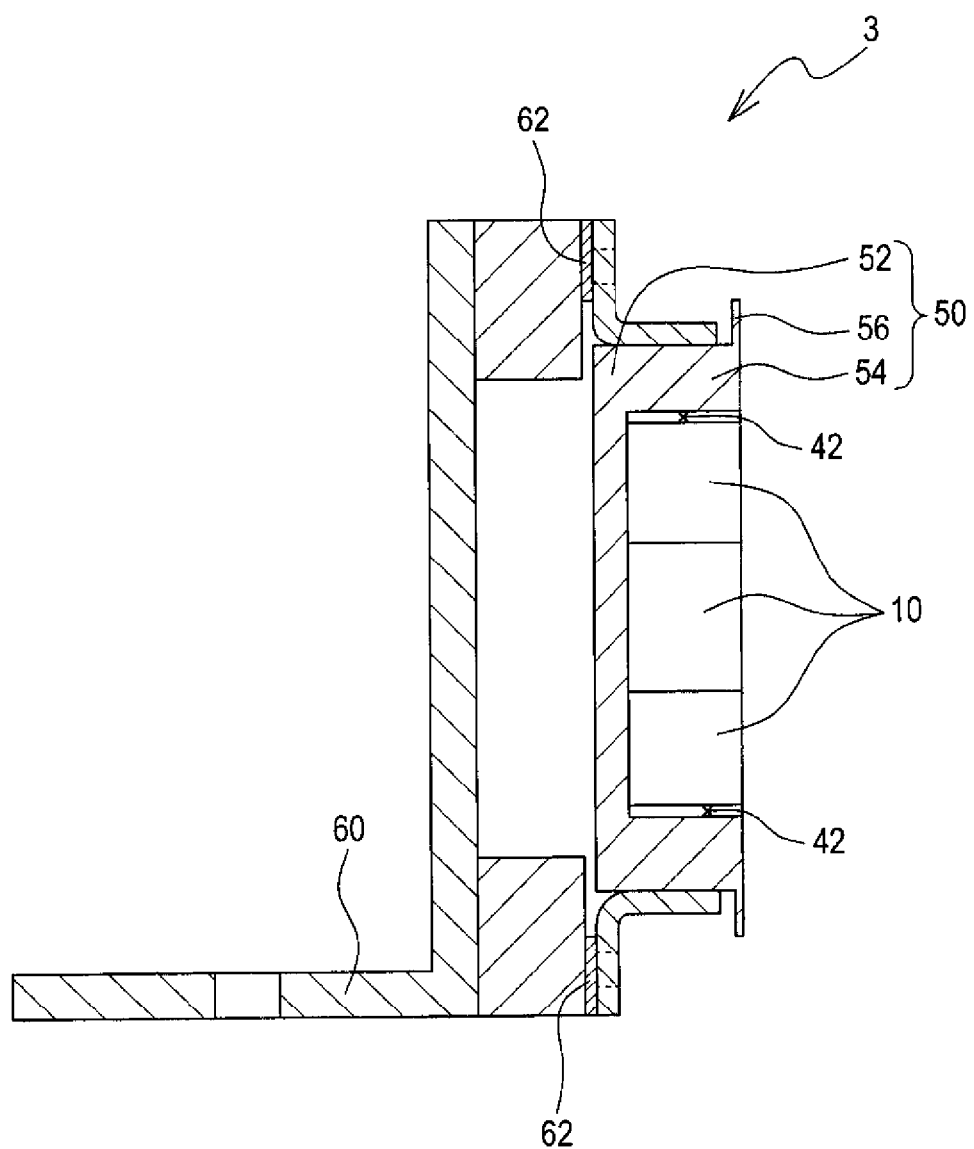
FIG. 6 is a sectional view of a second embodiment of an ultrasonic wave output apparatus, taken in a plane VI-VI of FIG. 7.
Figure 7:
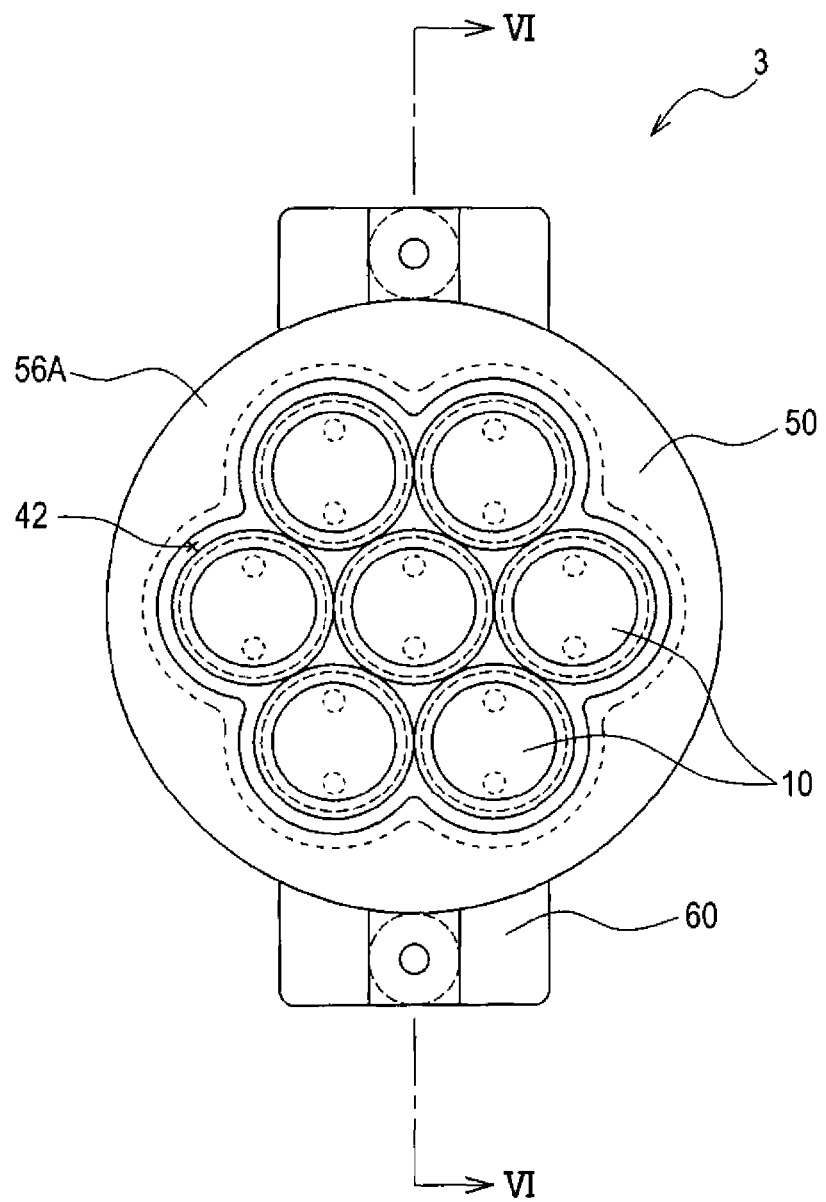
FIG. 7 is a front view of a second embodiment of an ultrasonic wave output apparatus.
Figure 8:
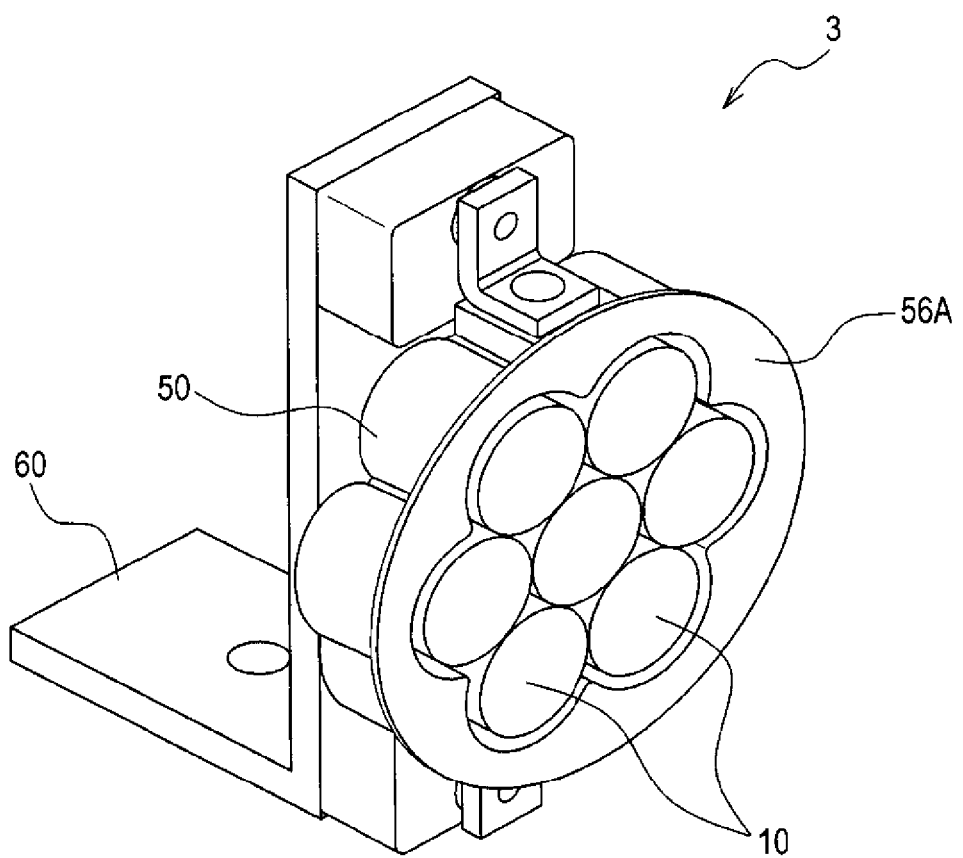
FIG. 8 is a perspective view of the second embodiment of an ultrasonic wave output apparatus.

In the ultrasonic wave output apparatus 3 of the second embodiment, as shown in FIGS. 6, 7 and 8, a plurality of ultrasonic wave output units 10 are included. Input signals that have the same frequency and same phase are input to respective ones of the plurality of ultrasonic wave output units 10.

Furthermore, instead of the case unit 20 having a retaining portion 22, a cylindrical portion 24 and a vibration portion 26, a case unit 50 having a retaining portion 52, a cylindrical portion 54 and a vibration portion 56 is provided. Furthermore, instead of the support member 30 and the vibration suppression member 32, a support member 60 and a vibration suppression member 62 are provided.

The retaining portion 52, the cylindrical portion 54, the vibration portion 56, the support member 60 and the vibration suppression member 62 have substantially the same functions as the above-described retaining portion 22, cylindrical portion 24, vibration portion 26, support member 30 and vibration suppression member 32.

The plurality of ultrasonic wave output units is mutually arranged such as to have no spaces separating them. Specifically, one of the ultrasonic wave output units 10 is disposed centrally, while the other six are arrayed around the periphery of that ultrasonic wave output unit 10.

The cylindrical portion 54 is configured such that the cross-sectional shape of its inner peripheral part follows the form of the outer periphery of the plurality of ultrasonic wave output units 10, when the ultrasonic wave output units 10 are arrayed side by side. A gap 42 which has a constant space between the inner peripheral part of the cylindrical portion 54 and the outer periphery of the plurality of ultrasonic wave output units 10 is formed.

The outer peripheral part of the cylindrical portion 24 is configured to form a curved surface which follows the outer periphery of the plurality of ultrasonic wave output units 10. That is to say, the cylindrical portion 54 is configured by deforming a plate-like member, having a substantially uniform thickness, to follow the outer periphery of the plurality of ultrasonic wave output units 10.

[2-3. Effects]

With the second embodiment described above, the following effects are exhibited in addition to the effects (1a) of the first embodiment.

(2a) In the ultrasonic wave output apparatus 3, a plurality of ultrasonic wave output units 10 are provided, and the cross-sectional shapes of the inner peripheral part and the outer peripheral part of the cylindrical portion 24 are configured to follow the shape of the outer periphery of the plurality of ultrasonic wave output units 10, when the ultrasonic wave output units 10 are arrayed side by side.

With such an ultrasonic wave output apparatus 3, since the cross-sectional shapes of the inner peripheral part and the outer peripheral part of the cylindrical portion 24 are configured to follow the shape of the outer periphery of the plurality of ultrasonic wave output units 10, greater rigidity is achieved for the cylindrical portion 24 than if the cylindrical portion 24 were formed as a simple cylindrical member.

(2b) In the ultrasonic wave output apparatus 3, the plurality of ultrasonic wave output units 10 are configured such that there are no gaps between them.

With such an ultrasonic wave output apparatus 3, variations in characteristics can be suppressed and the plurality of ultrasonic wave output units 10 can be readily used as a single ultrasonic wave output unit 10, due to the fact that the plurality of ultrasonic wave output units are arrayed without gaps between one another.

3. Other Embodiments

The present disclosure is not limited to the embodiments described above, and various modifications may be implemented.

(3a) With the second embodiment above, the input signals that are respectively supplied to the plurality of ultrasonic wave output units 10 are of the same phase, however the present disclosure is not limited to that. For example, the configuration may be such that the input signals supplied to the plurality of ultrasonic wave output units 10 are respectively identical in frequency but different in phase, to thereby change the directionality by producing mutual interference between the ultrasonic waves that are outputted.

(3b) A plurality of functions of a single constituent element of the above embodiments may be implemented by a plurality of constituent elements, or a single function of a single constituent element may be implemented by a plurality of constituent elements. Furthermore, a plurality of functions of a plurality of constituent elements may be implemented by a single constituent element, or a single function of a plurality of constituent elements may be implemented by a single constituent element. Moreover, a part of the configurations of the above embodiments may be omitted. Furthermore at least a part of the configuration of an above embodiment may be added or replaced a part of another one of the above embodiments. Furthermore, all modes that are contained in the technical concepts specified by the recitations which set out the scope of the claims are embodiments of the present disclosure.

(3c) With the configurations of the above embodiments, a cylindrical portion 24, 56 is provided, such as to be connected to a vibration portion 26, 56, however it is possible for the vibration portion 26, 56 to be directly connected to the ultrasonic wave output unit 10. In that case the cylindrical portion 24, 56 can be omitted.

(3d) Other than the above-described ultrasonic wave output apparatuses 1, 2, 3, the present disclosure can be implemented in various forms, such as a system which utilizes an ultrasonic wave output apparatus 1, 2 or 3 as a constituent element.

What is claimed is:

1. An ultrasonic wave output apparatus comprising:
at least one ultrasonic wave output unit configured to output ultrasonic waves corresponding to an input signal from a sound wave output surface along a predetermined travel direction; and
a vibration portion that has a vibration surface parallel to the sound wave output surface and set at a distance of $n\lambda$ from the sound wave output surface, n being an integer of 0 or more and $\lambda$ being the wavelength of the ultrasonic waves, that is a plate-like member that surrounds the periphery of the at least one ultrasonic wave output unit, in directions orthogonal to the travel direction, and that is configured to transmit vibration produced by the at least one ultrasonic wave output unit to the vibration surface;
wherein the vibration portion has an annular shape, which surrounds the periphery of the at least one ultrasonic wave output unit via a cap having a constant distance between the vibration portion and the at least one ultrasonic wave output unit.

2. The ultrasonic wave output apparatus according to claim 1, wherein the vibration surface of the vibration portion is positioned in the same plane as the sound wave output surface.

3. The ultrasonic wave output apparatus according to claim 1, further comprising a cylindrical portion that is configured to surround the periphery of the at least one ultrasonic wave output unit in directions orthogonal to the travel direction, that retains the at least one ultrasonic wave output unit, and that is connected to the vibration portion at an end that is on the side of the travel direction.

4. The ultrasonic wave output apparatus according to claim 3, wherein the cylindrical portion has a cylindrical shape, surrounding the periphery of the ultrasonic wave output unit.

5. An ultrasonic wave output apparatus comprising:
at least one ultrasonic wave output unit configured to output ultrasonic waves corresponding to an input signal from a sound wave output surface along a predetermined travel direction; and
a vibration portion that has a vibration surface parallel to the sound wave output surface and set at a distance of $n\lambda$ from the sound wave output surface, n being an integer of more than 0 and $\lambda$ being the wavelength of the ultrasonic waves, that is a plate-like member that surrounds the periphery of the at least one ultrasonic wave output unit, in directions orthogonal to the travel direction, and that is configured to transmit vibration produced by the at least one ultrasonic wave output unit to the vibration surface.

6. The ultrasonic wave output apparatus according to claim 5, wherein the vibration portion has an annular shape, which surrounds the periphery of the at least one ultrasonic wave output unit.

7. The ultrasonic wave output apparatus according to claim 5, further comprising a cylindrical portion that is configured to surround the periphery of the at least one ultrasonic wave output unit in directions orthogonal to the travel direction, that retains the at least one ultrasonic wave output unit, and that is connected to the vibration portion at an end that is on the side of the travel direction.

8. The ultrasonic wave output apparatus according to claim 7, wherein the cylindrical portion has a cylindrical shape, surrounding the periphery of the at least one ultrasonic wave output unit.

* * * * *